United States Patent
McMillen et al.

(10) Patent No.: US 6,905,170 B2
(45) Date of Patent: Jun. 14, 2005

(54) FOLD DOWN SEAT LUMBAR SUPPORT APPARATUS AND METHOD

(75) Inventors: Robert J. McMillen, Tecumseh (CA); Robert Renato Colja, Windsor (CA); Lukic Zeljko, Windsor (CA)

(73) Assignee: L & P Property Management Company, South Gate, CA (US)

( * ) Notice: Subject to any disclaimer, the term of this patent is extended or adjusted under 35 U.S.C. 154(b) by 28 days.

(21) Appl. No.: 10/349,525

(22) Filed: Jan. 22, 2003

(65) Prior Publication Data

US 2004/0140700 A1 Jul. 22, 2004

(51) Int. Cl.[7] .............................................. A47C 3/025
(52) U.S. Cl. .............................. 297/284.4; 297/284.1; 297/284.8
(58) Field of Search ........................... 297/284.1, 284.2, 297/284.4, 284.8, 284.9

(56) References Cited

U.S. PATENT DOCUMENTS

| | | | |
|---|---|---|---|
| 1,182,854 A | 5/1916 | Poler | |
| 2,756,809 A | 7/1956 | Endresen | 155/182 |
| 2,843,195 A | 7/1958 | Barvaeus | 155/182 |
| 2,942,651 A | 6/1960 | Binding | 155/131 |
| 3,378,299 A | 4/1968 | Sandor | 297/284 |
| 3,490,084 A | 1/1970 | Schuster | 5/351 |
| 3,492,768 A | 2/1970 | Schuster | 52/98 |
| 3,724,144 A | 4/1973 | Schuster | 52/108 |
| 3,762,769 A | 10/1973 | Poschl | 297/284 |
| 3,929,374 A | * 12/1975 | Hogan et al. | 297/61 |
| 3,938,858 A | * 2/1976 | Drabert et al. | 297/284.4 |
| 4,040,661 A | * 8/1977 | Hogan et al. | 297/284.4 |
| 4,136,577 A | 1/1979 | Borgersen | 74/479 |
| 4,153,293 A | 5/1979 | Sheldon | 297/284 |
| 4,156,544 A | 5/1979 | Swenson et al. | 297/284 |
| 4,182,533 A | 1/1980 | Arndt et al. | 297/284 |
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |

(Continued)

FOREIGN PATENT DOCUMENTS

| | | | |
|---|---|---|---|
| AT | 401 497 | 9/1996 | B60N/2/22 |
| DE | 2040794 | 7/1971 | A47C/7/28 |
| DE | 206 4419 | 7/1972 | B60N/1/06 |
| DE | 29 47 472 | 8/1980 | B60N/1/00 |
| DE | 42 20 995 A1 | 1/1994 | A47C/7/46 |
| EP | 0 006 840 B1 | 2/1982 | A47C/23/00 |
| EP | 0 169 293 B1 | 10/1988 | A47C/7/46 |
| EP | 0 322 535 A1 | 7/1989 | A47C/7/46 |
| EP | 0 485 483 B1 | 1/1994 | A47C/7/46 |
| EP | 0 434 660 B1 | 5/1995 | A47C/7/46 |

(Continued)

Primary Examiner—Laurie K. Cranmer
(74) Attorney, Agent, or Firm—Husch & Eppenberger, LLC; Grant D. Kang (57) ABSTRACT

A fold down seat back has a lumbar support device in it. A traction cable is operatively engaged at one end with the lumbar support device to actuate it. The fold down seat back includes a rotating cable tension unit and a fixed torsion bar. The rotating member moves relative to the fixed member when said fold down seat back is folded down. The traction cable is comprised of a sleeve having a first end and a second end and a wire having a first end and a second end. The wire is disposed to slide axially through the sleeve. The first sleeve end is attached to the rotating cable tension unit. The wire end is attached to the fixed torsion bar. The wire end may be attached to the torsion rod with a pulley. These attachments of the sleeve end and the wire end cause the wire to be drawn axially through the sleeve when the seat back is folded up, extending a lumbar support, and cause the wire to be relaxed when the seat back is folded down, flattening the lumbar support.

20 Claims, 5 Drawing Sheets

U.S. PATENT DOCUMENTS

| | | | |
|---|---|---|---|
| 4,390,210 A | 6/1983 | Wisniewski et al. | 297/452 |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,627,661 A | 12/1986 | Ronnhult et al. | 297/284 |
| 4,630,865 A | 12/1986 | Ahs | 297/284 |
| 4,632,454 A | 12/1986 | Naert | 297/284 |
| 4,676,550 A | 6/1987 | Neve De Mevergnies | 297/353 |
| 4,679,848 A | 7/1987 | Spierings | 297/284 |
| 4,730,871 A | 3/1988 | Sheldon | 297/230 |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 5,005,904 A | 4/1991 | Clemens et al. | 297/284 |
| 5,472,261 A * | 12/1995 | Oplenskdal et al. | 297/342 |
| 5,474,358 A | 12/1995 | Maeyaert | 297/284.7 |
| 5,498,063 A | 3/1996 | Schuster et al. | 297/284.1 |
| 5,518,294 A | 5/1996 | Ligon, Sr. et al. | 297/284.4 |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,588,703 A | 12/1996 | Itou | 297/284.4 |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,681,079 A * | 10/1997 | Robinson | 297/61 |
| 5,704,687 A | 1/1998 | Klingler | 297/284.4 |
| 5,718,476 A | 2/1998 | De Pascal et al. | 297/284.4 |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | Van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |
| 6,050,641 A | 4/2000 | Benson | 297/284.4 |
| 6,079,783 A | 6/2000 | Schuster, Sr. et al. | 297/284.4 |
| 6,092,871 A | 7/2000 | Beaulieu | 297/184.4 |
| 6,152,531 A | 11/2000 | Deceuninck | 297/284.4 |
| 6,152,532 A | 11/2000 | Cosentino | 297/284.4 |
| 6,158,300 A | 12/2000 | Klingler | 74/526 |
| 6,227,617 B1 | 5/2001 | von Möller | 297/284.4 |
| 6,227,618 B1 | 5/2001 | Ligon, Sr. et al. | 297/284.4 |
| 6,254,186 B1 | 7/2001 | Falzon | 297/284 |
| 6,254,187 B1 | 7/2001 | Schuster, Sr. et al. | 297/284.1 |
| 6,270,158 B1 | 8/2001 | Hong | 297/284.4 |
| 6,296,308 B1 | 10/2001 | Cosentino et al. | 297/284.4 |
| 6,334,651 B1 | 1/2002 | Duan et al. | 297/284.4 |
| 6,554,360 B1 * | 4/2003 | Wilke et al. | 297/342 |
| 6,736,459 B1 | 5/2004 | Sturt | 297/378.1 |

FOREIGN PATENT DOCUMENTS

| | | | | |
|---|---|---|---|---|
| EP | 0 540 481 B1 | 12/1995 | | A47C/7/46 |
| EP | 0 662 795 B1 | 12/1996 | | A47C/7/46 |
| EP | 0 702 522 B1 | 3/1997 | | A47C/7/46 |
| EP | 0 696 251 B1 | 7/1997 | | B60N/2/44 |
| EP | 0 746 219 B1 | 11/1998 | | A47C/7/46 |
| EP | 0 797 399 B1 | 11/1998 | | A47C/7/46 |
| EP | 0 698 360 B1 | 3/2000 | | A47C/7/46 |
| FR | 2 596 334 | 10/1987 | | B60N/1/06 |
| GB | 1 423 617 | 2/1976 | | A47C/7/46 |
| GB | 2 013 487 | 2/1978 | | A47C/7/46 |
| SU | 587924 | 2/1978 | | A47C/7/46 |
| WO | WO/00/00064 | 1/2000 | | A47C/3/025 |

* cited by examiner

FOLD DOWN SEAT LUMBAR SUPPORT APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

This invention is in the field of lumbar supports for automobiles.

2. Related Art

Lumbar supports for automobile seats are a known and popular ergonomic option. Whether lumbar supports are static or variable, their effect depends upon the creation of depth in the portion of the seat positioned to correspond to the passenger's lumbar spine.

Another popular feature in vehicles having cargo space such as sport utility vehicles, station wagons and the like, is fold down rear seats. Folding these seats down increases the cargo space. For that purpose, it is advantageous that the seat backs for the fold down rear seats be as thin as possible in their down position. Any reduction in the depth of the seat back when it is folded down increases the amount of available cargo space above it.

Hence, there is a need in the industry for a fold down rear seat back that has depth in the lumbar area when in its up position and is as thin as possible when in its down position.

SUMMARY OF THE INVENTION

It is in view of the above problems that the present invention was developed. The present invention is a fold down rear seat back for a motor vehicle that has depth in the lumbar area when in its up position, and automatically reduces that depth when folded down into its folded position.

A lumbar support device is in a fold down seat back. A traction cable is operatively engaged at one end with the lumbar support device. The fold down seat back includes a rotating member and a fixed member. The fixed member may be a torsion bar. The rotating member may be a mount, a cable tension unit, or other device operatively engaged with the other end of the traction cable and with the fixed member. The rotating member moves relative to the fixed member when said fold down seat back is folded down. The traction cable is comprised of a sleeve having a first end and a second end and a wire having a first end and a second end. The wire is disposed to slide axially through the sleeve.

The first sleeve end is attached to one of the fixed member or the rotating member; the first wire end is attached to the other member. The wire end may be attached to the torsion rod with a pulley. These attachments of the sleeve end and the wire end cause the wire to be drawn axially through the sleeve when the seat back is folded up, extending a lumbar support, and cause the wire to be relaxed when the seat back is folded down, flattening the lumbar support when the seat back is down.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
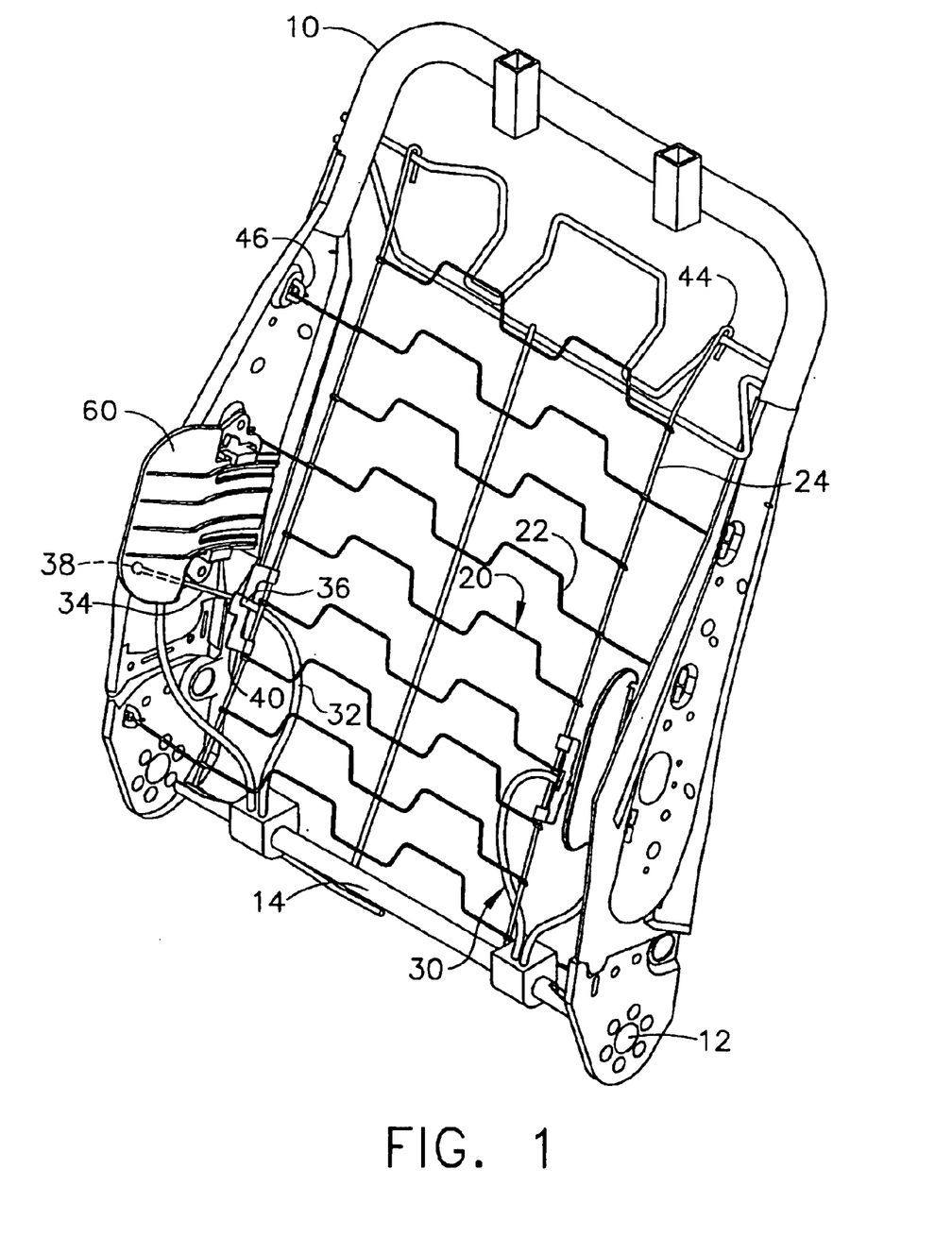
FIG. 1 is an isometric view of the automatic lumbar support as installed in a seat frame.
Figure 2:
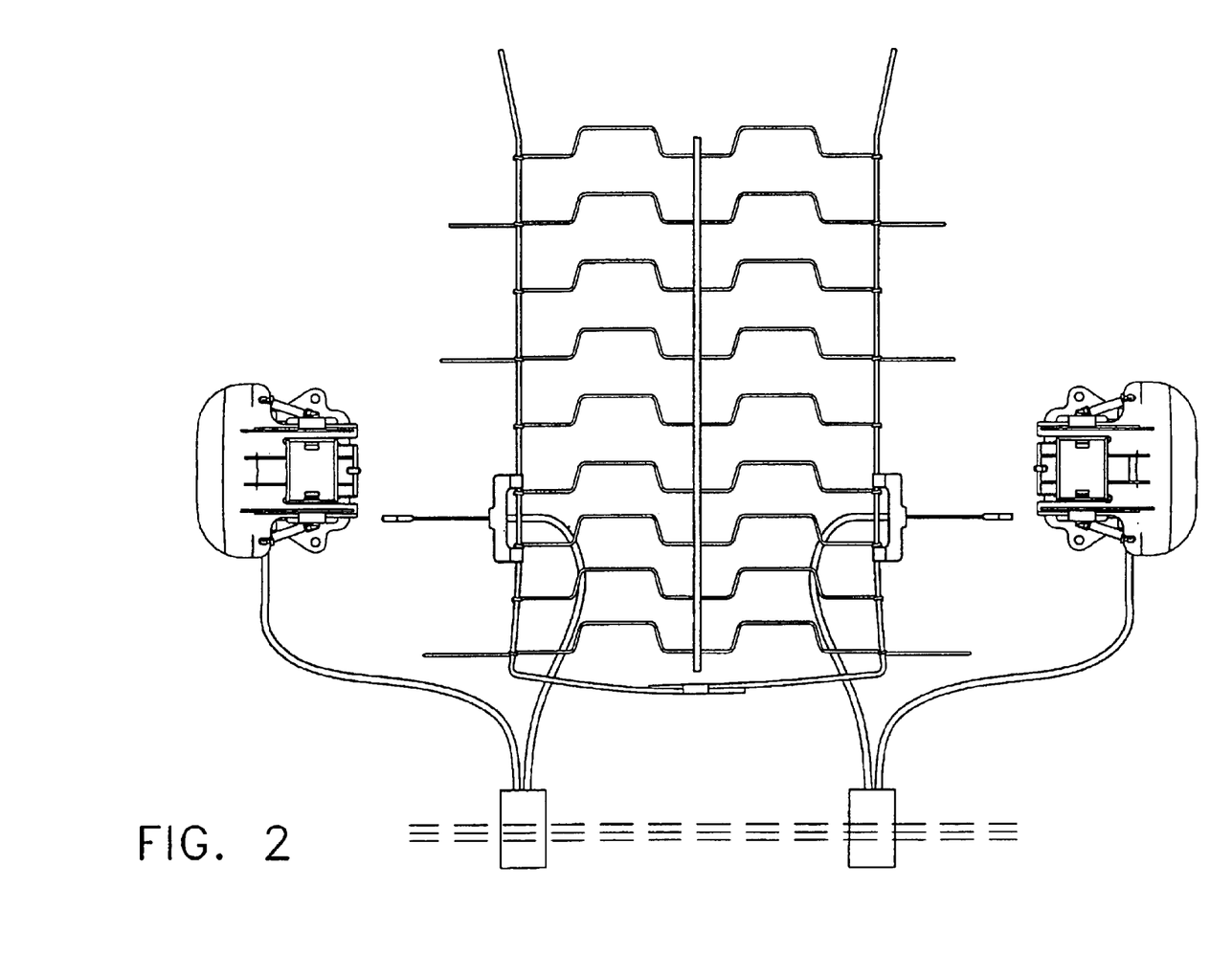
FIG. 2 is a schematic front view of the automatic lumbar support.

Referring to the accompanying drawings in which like reference numbers indicate like elements, FIG. 1 is an isometric view of the automatic lumbar support for a fold down seat back of the present invention. Seat back frame 10 is hingedly connected to a seat bottom frame (not shown) at connection 12. Although other connections between seat backs and seat bottoms are possible, it is common for a hinge connection such as that depicted to include a torsion bar 14. It is also common for a torsion bar 14 to be fixed such that it remains stationary at all positions of the seat back, and does not move when the seat back moves. Lumbar support 20 is mounted on seat frame 10.

It is appreciated by those in the art that many variable types of lumbar supports are known including many lumbar supports that are actuated by traction cables. Such traction cable actuated lumbar supports include, for example, arching pressure surfaces, such as are disclosed in U.S. Pat. Nos. 5,397,164 and 5,913,569, concave tensionable straps, such as disclosed in U.S. application Ser. No. 10/154,636, push paddles, such as are disclosed in U.S. application Ser. No. 09/798,657, and scissors type supports, such as are disclosed in U.S. application Ser. No. 10/315,320, all of which are incorporated by reference herein. Because of all of the referenced lumbar supports share the common feature of being actuated by traction that is applied with a traction cable, actuation of all these lumbar supports according to the automatic traction cable actuation described herein is considered to be within the scope of the present invention.

In the depicted embodiment, lumbar support 20 is an array of flexible wires including horizontal wires 22 and vertical wires 24. The depicted lumbar support wire array 20 is biased toward a substantially flat position. However, its flexibility allows it to be drawn into an arched or convex position having depth. This arched, convex position is achieved by the application of traction with traction cables.

Traction cables are known in the industry. They are sometimes called "Bowden cables." They include a sleeve or conduit with a cable or wire disposed within the sleeve and capable of sliding axially through it. As installed for use, an actuator at one end of the cable holds the sleeve end stationary while pulling the wire end out of the cable and away from the sleeve end. This achieves a corresponding traction or draw on the opposite end of the wire. The opposite end of the sleeve and wire are both connected to a lumbar support, or to a lumbar support combined with a connection to the seat frame. These connections are designed to move the lumbar support in to and out of arched, convex or otherwise lumbar supporting positions in response to the tractive force applied to the first end of the traction cable.

Figure 3:
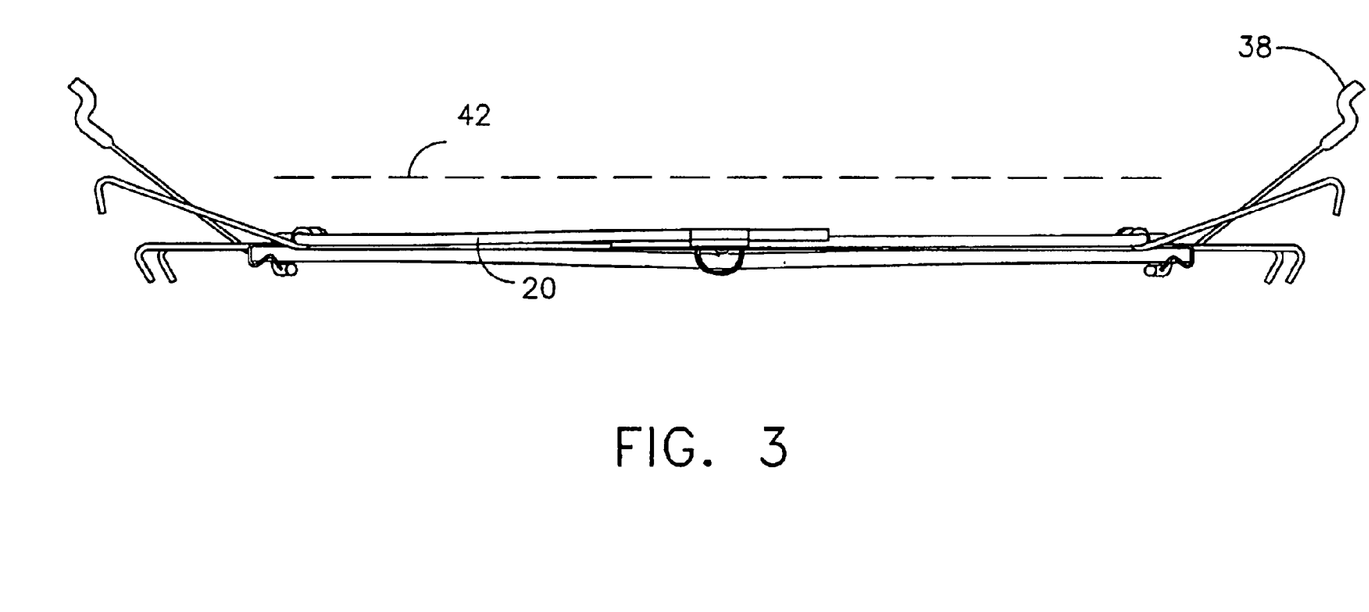
FIG. 3 is a top view of the automatic lumbar support.
Figure 4:
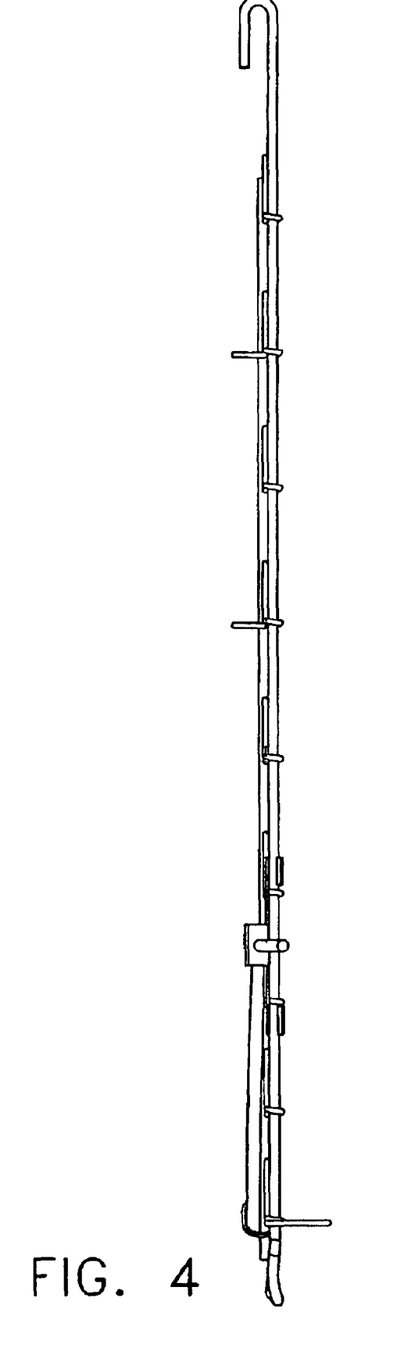
FIG. 4 is a side view of the automatic lumbar support.

In the depicted embodiment, tractive force is used to actuate the lumbar support via traction cables. Traction cable 30 is comprised of a sleeve (or "conduit") 32 and a wire 34 sliding through the sleeve. The sleeve has an end 36 which is fixedly attached to the lumbar support at bracket 40. Wire 34 extends beyond bracket 40. Wire 34 has a hook 38 at its end by means of which the wire end 38 is attached to a hole or a notch in seat frame 10 that is pre-configured to receive wire end hook 38. In the depicted embodiment, this hole or notch to which the wire end 38 is affixed is positioned forward of the bracket 40 and lumbar support 20. As is best seen in FIG. 3, this forward positioning of the wire ends 38 creates a depth of space into which lumbar support 20 may be drawn when traction is applied to the traction cable. Schematic line 42 indicates the greatest extent of lumbar support depth achievable by the depicted embodiment. The difference between schematic line 42 in FIG. 3 and the flat position of lumbar support 20 depicted in FIG. 3 represents both the degree of lumbar support that will be automatically actuated by the apparatus of the present invention, and also represents the amount of space that will be saved upon automatic flattening of the lumbar support when the seat back is folded down into its flat position.

As indicated above, vertical wires 24 and horizontal wires 22 are flexible. Of course seat frame 10 is inflexible. Accordingly, when traction is applied to traction cable 30 wire end 38 will not be able to move. Accordingly sleeve end 36 will move towards the point at which wire end 38 is attached to frame 10. That is, it will move forward. Through bracket 40, this will pull vertical wire 24 forward as well. In the depicted embodiment, this happens simultaneously on both lateral vertical wires. As is evident from FIG. 1, the attachment of brackets 40 and wire ends 38 is located at a position corresponding to the lumbar spine of the seat occupant. Accordingly a band of support will be created corresponding to the level of brackets 40 in the lumbar area. Wire array 20 is also supported at an upper end at mounts 44 and laterally at mounts 46. These mounts are also flexible, but not being at a level corresponding to the brackets 40, are not drawn forward into a lumbar supporting position. In an alternative embodiment, the entire wire array 20 may be replaced by an array having more rigid wires. For example vertical wires 24 could be completely rigid and horizontal wires 22 more stiff. In such a case, traction on the traction cables would draw the entire array forward creating a different sensation for a seat occupant which may be more desirable under some circumstances.

Traction is applied at cable tension unit 50. In the depicted embodiment, cable tension unit 50 rotates with the seat frame. Horizontal torsion rod 14 remains stationary, and does not rotate. In alternative embodiments also considered to be within the scope of the present invention, the torsion rod may turn with the seat back while the cable tension unit may remain stationary. Relative motion of the tension unit and torsion rod actuate the traction cable as follows. Cable tension unit 50 will have a hole or slot or channel narrowly dimensioned to allow passage therethrough of the traction cable wire 34, but too narrow to allow passage of the traction cable sleeve 32. Within the cable tension unit 50 traction cable wire 34 is attached to torsion rod 14. This attachment may be by any of a wide variety of known means of mechanical attachment, including without limitation, pulleys, levers and the like. When the seat back is folded upwards into its up position, the tension unit and the cable sleeve end 52 mounts on it rotate away from the attachment of the traction cable 34 to the torsion rod 14. The relative motion of cable tension unit 50 and torsion rod 14 will apply traction to draw the traction cable wire 34 out of and through the traction cable sleeve 32. As explained above, this traction at the first end of the traction cable will engage and actuate the lumbar support 20 at the other end of the traction cable, causing it to be drawn by traction into its lumbar supporting position.

Also depicted are bolsters 60. Bolsters are paddles deployed on the sides of the seat for lateral support of the passenger. They are also actuated by traction in a known manner. Like the lumbar support, bolsters 60 have a non supporting flat position and a supporting extended position. The extended position has a greater depth, front to back, then the retracted or flat position. Actuation of the bolsters to move them into their extended position is achieved by connecting the traction cable 30 to the cable tension unit in the same manner as described above for actuation of the lumbar support 20.

The converse operation is folding down the seat back. Moving the seat back down will again move the cable tension unit 50 and the torsion rod 14 relative to each other. The cable tension unit is deployed such that this motion of the seat back downwards will move the cable sleeve end 52 and the attachment of the traction cable wire 34 closer to one another. This relaxes tension on the first end of the traction cable, which in turn reduces the distance between the second traction cable wire end 38 and a traction cable sleeve second end 36. Accordingly, this relaxation of traction on the traction cable allows the lumbar support 20 and bolsters 60 to return to their untensioned, flat position. This return to the flat position is aided by the inherent spring or bias of the lumbar support wires 22 and 24 towards a flat position. It is also aided by the weight of the seat, weight of the cargo and force of the user pushing down on the back of the seat back.

Figure 5:
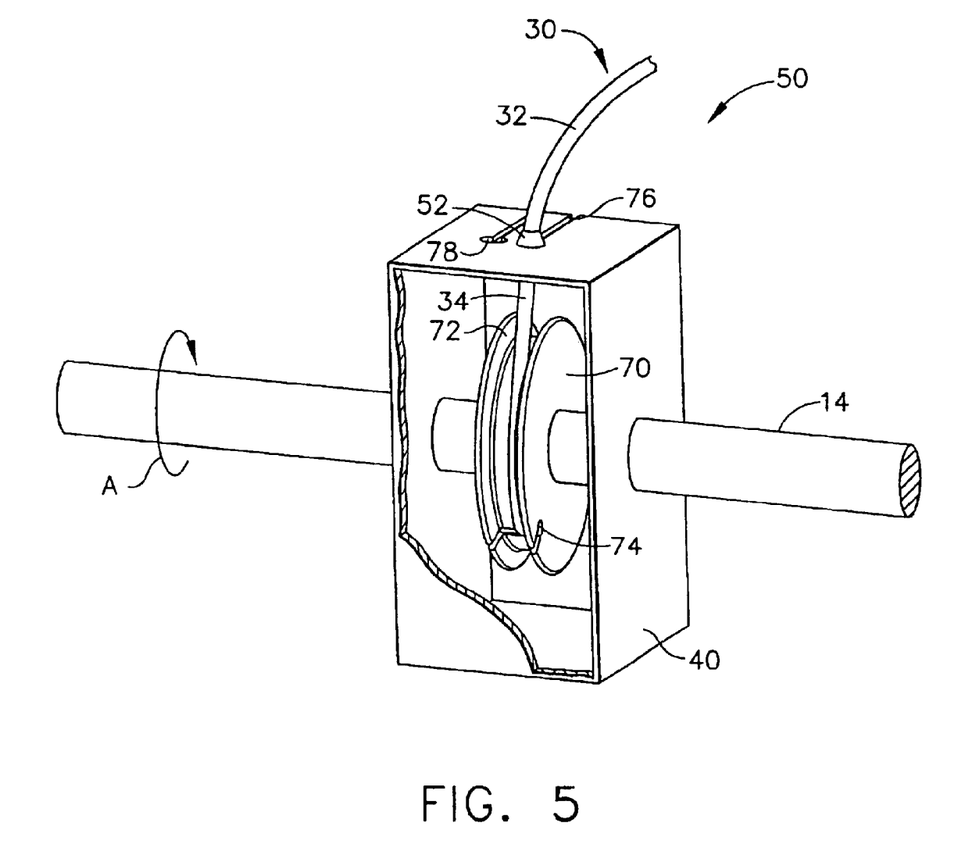
FIG. 5 is a cutaway detail of the cable tension unit.

FIG. 5 is a cutaway detail of the cable tension unit 50. The cable tension unit is fixedly attached to seat back frame in the depicted embodiment (not shown). Again, the torsion rod 14 could be fixedly attached to the seat back with the cable tension unit being fixedly attached to the seat bottom, as an alternative design. The present invention may be actuated by either component being attached to the seat back and the other component fixed to the bottom or otherwise fixed to the car frame, so long as the cable tension unit and torsion rod rotate relative to one another.

Pulley 70 is attached to torsion rod 14 inside of the cable tension unit 50. Pulley 70 is fixedly attached to the torsion rod 14 so that it does not move relative to the torsion rod 14. Pulley 70 is designed to pick up and release traction cable wire 34. Accordingly, pulley 70 has a circumferential channel 72 into which traction cable wire 34 may be taken up. Pulley 70 also has a seat 74 into which a bullet at the end of tension cable wire 34 may be inserted upon assembly. In operation, wire bullet seat 74 will hold the wire end in place as tension is applied. A slot 76 is fabricated into a wall of cable tension unit 50. This slot is used in assembly to lead the traction cable wire 34 through the cable tension unit to where it can be seated on pulley 70. Slot 76 also includes a key hole or a widening which forms another seat 78 for receiving the traction cable sleeve end 52. Hence, keyhole seat 78 is wide enough to allow passage of the traction cable wire 34 therethrough, but not passage of the traction cable sleeve 32.

In operation, when the seat back frame is rotated up, cable tension unit 50 will also rotate up or in the direction indicated by arrow A in FIG. 5. In so doing, traction cable sleeve seat 78 and the traction cable sleeve end 52 seated within it will be moved away from where the traction cable wire 34 is anchored to the stationary pulley at 74. This will of course have the effect of drawing the traction cable wire 34 through the traction cable sleeve 32, and consequently applying traction to it. This traction will effect actuation of the lumbar support and, optionally, bolsters at the other end of the traction cable. Accordingly, when the seat back is up, the traction cable is tensioned and the lumbar support is out. When the seat back is folded down, or opposite to arrow A in FIG. 5, cable tension unit 50 is rotated in a direction that will move the traction cable sleeve end 52 closer to the traction cable wire end anchor 74, allowing the tension on the wire to be reduced and allowing the wire to slide back into the sleeve 32. Accordingly, released tension on the other end the traction cable will allow the lumbar support, and optionally bolsters, to flatten, thereby reducing the thickness of the seat back in its folded down position, increasing cargo space.

It is considered to be within the scope of the present invention that various configurations of cable tension units may be used. For example, a traction cable sleeve mount seated in a portion of a seat back frame combined with a traction cable wire end bullet seat located in the frame of the seat bottom such that the sleeve end and wire end are separated when the seat is folded up. It is also contemplated that to be within the scope of the present invention that the automatic actuation upon folding of the present invention be combined with any of the variable lumbar support technologies incorporated by reference herein.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An automatic ergonomic support for a fold down seat that is up when unfolded and down when folded comprising:
an ergonomic support device comprising an extended space and a flattened space, wherein said extended space has a greater depth than said flattened space; wherein said ergonomic support device is disposed within said seat;
a fixed member;
a rotating member attached to said fold down seat back, said rotating member being operatively engaged with said fixed member such that said rotating member moves relative to said fixed member when said fold down seat back is folded down; and
at least one traction cable having a first end and a second end, said traction cable being comprised of a sleeve having a first sleeve end and a second sleeve end and further comprised of a wire disposed to slide axially through said sleeve, said wire having a first wire end and a second wire end; wherein said first sleeve end is attached to one of said fixed member and said rotating member; wherein said first wire end is attached to another of said fixed member and said rotating member; said attachments of said first sleeve end and said first wire end causing said wire to slide axially through said sleeve when said seat is folded down; and said traction cable second end being operatively engaged with said ergonomic support device such that said ergonomic support device is extended when said seat is up and flattened when said seat is down.

2. The automatic ergonomic support of claim 1, wherein said attachment of said first wire end to the other of said fixed member or said rotating member is via a pulley.

3. The automatic ergonomic support of claim 1, wherein said ergonomic support device is a lumbar support.

4. The automatic ergonomic support of claim 3, wherein said lumbar support is a flexible wire array.

5. The automatic ergonomic support of claim 3, wherein said lumbar support device is a rigid wire array.

6. The automatic ergonomic support of claim 1, wherein said rotating member is a cable tension unit and said fixed member is a torsion rod.

7. The automatic ergonomic support of claim 1, wherein said fixed member is a cable tension unit and said rotating member is a torsion rod.

8. The automatic ergonomic support of claim 1, wherein said ergonomic support device selected from the group consisting of: a push paddle, a scissors arching pressure surface or a concave strap.

9. The automatic ergonomic support of claim 1, wherein said ergonomic support device is a bolster.

10. The automatic ergonomic support of claim 1, wherein said rotating member is a frame of said seat back.

11. The automatic ergonomic support of claim 1, wherein said fixed member is a frame of a bottom of said seat.

12. The automatic ergonomic support of claim 1, wherein said ergonomic support device is combined with a user variable lumbar support.

13. An ergonomic support system for a seat with a folded position and an unfolded position, comprising:
an ergonomic support device adapted to mount within the seat, wherein said ergonomic support device comprises a flat position and an extended position, said extended position having more depth than said flattened position;
an actuator operatively engaged with said ergonomic support device and adapted to be mounted to the seat such that at least one of lowering and raising said fold down seat back operates said actuator; and
a traction cable engaged with said actuator means and said ergonomic support device, such that operating said actuator changes tension in said traction cable and produces said flat position of said ergonomic support when the seat is in its folded position and produces said extended position of said ergonomic support when the seat is in its unfolded position.

14. The ergonomic support system of claim 13, wherein said ergonomic support device is selected from the group of supports consisting of a bolster, a lumbar, and a combination of a lumbar and a bolster.

15. The ergonomic support system of claim 13, wherein said actuator is comprised of a fixed member and a moving member and said traction cable is comprised of a sleeve and a wire disposed to slide axially in said sleeve, wherein one of said sleeve and said wire is attached to said fixed member and another of said sleeve and said wire is attached to said moving member.

16. The ergonomic support system of claim 15, further comprising a foldable seat frame comprising a fixed portion and a rotating portion, wherein said fixed member of said actuator engages said fixed portion of said frame and said moving member of said actuator engages said rotating portion of said frame such that moving said rotating portion relative to said fixed portion operates said actuator.

17. An improved ergonomic support system for a seat wherein the seat comprises a seat frame with a folded position, an unfolded position and a rotation therebetween, said seat frame comprising a fixed portion and a rotating portion, wherein the improvement comprises:

an ergonomic support device mounted to the seat frame, said ergonomic support comprising a flat position and an extended position, said extended position having more depth than said flattened position, and said ergonomic support selected from the group of supports consisting of a bolster, a lumbar, and a combination of a lumbar and a bolster;

a means for actuating said ergonomic support device using the rotation of the seat frame between the folded position and the unfolded position; and a traction cable engaged with said actuating means and the ergonomic support device such that operating said actuating means changes tension in said traction cable and produces the flat position of the ergonomic support when the seat frame is in its folded position and produces the extended position of said ergonomic support when the seat frame is in its unfolded position.

18. The ergonomic support system of claim 17, wherein said ergonomic support device is mounted to at least one of the fixed portion and the rotating portion of the seat frame.

19. The ergonomic support system of claim 17, wherein said actuating means is comprised of a fixed mount connected to the fixed portion of the seat frame and a rotating mount connected to the rotating portion of the seat frame.

20. The ergonomic support system of claim 17, further comprising a plurality of ergonomic support devices engaged with said actuating means.

* * * * *

UNITED STATES PATENT AND TRADEMARK OFFICE
CERTIFICATE OF CORRECTION

PATENT NO. : 6,905,170 B2
DATED : June 14, 2005
INVENTOR(S) : McMillen et al.

It is certified that error appears in the above-identified patent and that said Letters Patent is hereby corrected as shown below:

<u>Column 6,</u>
Line 51, reads "down seat back operates" should read -- down seat back frame operates --.

Signed and Sealed this

Sixteenth Day of August, 2005

JON W. DUDAS
*Director of the United States Patent and Trademark Office*